United States Patent [19]

Thompson

[11] Patent Number: 4,545,974

[45] Date of Patent: Oct. 8, 1985

[54] PROCESS FOR PRODUCING ALKALI METAL FERRATES UTILIZING HEMATITE AND MAGNETITE

[76] Inventor: John A. Thompson, Nassau, The Bahamas

[21] Appl. No.: 590,567

[22] Filed: Mar. 16, 1984

[51] Int. Cl.$^4$ ............................................. C01G 49/00
[52] U.S. Cl. .................................................... 423/594
[58] Field of Search ........................................ 423/594

[56] References Cited

U.S. PATENT DOCUMENTS 2,835,553  5/1958  Harrison et al. .................... 423/594

FOREIGN PATENT DOCUMENTS 1013272  1/1958  Fed. Rep. of Germany ...... 423/594

OTHER PUBLICATIONS

Bailar et al, "Comprehensive Inorganic Chemistry", Pergamon Press, N.Y., vol. 3, 1973.

Primary Examiner—H. T. Carter
Attorney, Agent, or Firm—Kenyon & Kenyon

[57] ABSTRACT

Alkali metal iron (IV) and iron (VI) ferrates are produced by forming a particulate mixture of reactants including an alkali metal nitrogen oxygen compound and an iron material selected from the group of iron oxide, $Fe_2O_3$, $Fe_3O_4$ and an iron compound which self-reacts at a temperature less than about 1100° C. to form $Fe_2O_3$. The mixture of reactants is subjected to a predetermined elevated temperature for a predetermined time duration sufficient to bring about a reaction between the reactants which produces at least one of iron (IV) and iron (VI) ferrates. The molar ratio of alkali metal nitrogen oxygen compound to the iron material is preferably in the range extending between about 4:1 and about 8:1.

23 Claims, No Drawings

PROCESS FOR PRODUCING ALKALI METAL FERRATES UTILIZING HEMATITE AND MAGNETITE

BACKGROUND OF THE INVENTION (a) Field of the Invention

The present invention relates to alkali metal ferrates and, in particular, to methods for the preparation of alkali metal ferrates where the iron therein has a valance of +4 or +6.

Although the most common and familiar forms of iron in combination with other elements are those wherein iron has a valence or oxidation state of +2 or +3, other compounds of iron such as iron (IV) and iron (VI) are known in the art. Two of the more useful iron (IV) and iron (VI) compounds are the ferrates, i.e., salts of iron (IV) and iron (VI). Iron (IV) ferrates (sometimes referred to as "perferrites") ($FeO_3^{2-}$) and iron (VI) ferrate ($FeO_4^{2-}$) are generally useful in a variety of chemical reactions as oxidizing agents. Iron (VI) ferrates, in particular are very strong oxidizing agents in aqueous solution, and stable, water soluble ferrates such as potassium or sodium ferrate are, therefore, particularly useful in removing electrons (i.e., oxidizing) from other chemical species. A limiting factor in the broader utilization of iron (IV) and iron (VI) ferrates is the unavailability of an inexpensive and simple means for the synthesis of the pure forms of these compounds in relatively high yield.

(b) Description of the Prior Art

A typical method utilized for the production of alkali metal ferrates comprises electrochemical techniques wherein a 35-40% NaOH solution is used to convert scrap iron to a concentrated solution of $Na_2FeO_4$ (iron (VI)) using 10-15 cm$^2$ electrodes with a 2 cm separation and an initial resistance of 2-5 ohms. Another method comprises the wet chemical oxidation of a soluble iron (III) compound by hypochlorite, followed by chemical precipitation of $FeO_4^{2-}$ with potassium hydroxide to form $K_2FeO_4$, and followed by recrystallization to obtain a high purity solid. Still another method comprises the fusion of iron filings with potassium nitrate and extracting with water.

U.S. Pat. No. 2,835,553 of Harrison, et al. discloses a multi-step process for preparing alkali metal ferrates wherein an alkali metal iron (III) ferrate (typically known as a "ferrite") is reacted at elevated temperature in the presence of free gaseous oxygen, with an alkali metal compound (which may be the same or different than the alkali metal present in the alkali metal (III) ferrate) to produce the ferrate (IV) of the alkali metal or metals. The alkali metal ferrate (III) itself requires synthesis from more readily available materials, e.g., iron oxide. The ferrate (IV) produced in this manner may then be dissolved in water to produce ferrate (VI) according to the following equation (where, e.g., the alkali metal is sodium):

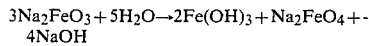
$3Na_2FeO_3 + 5H_2O \rightarrow 2Fe(OH)_3 + Na_2FeO_4 + 4NaOH$

In the foregoing processes, electrical energy is consumed and therefore expensive procedures are employed (e.g., electrolysis) or complicated multi-step procedures are required to produce iron (IV) or iron (VI) ferrates from more readily available materials. Moreover, in most cases, the iron (VI) ferrates produced in these methods are in solution and require a crystallization therefrom in order to avoid the obvious handling, shipping and storage disadvantages associated with aqueous solutions.

SUMMARY OF THE INVENTION

It is an object of the present invention to provide a method for the direct preparation of iron (IV) and iron (VI) alkali metal ferrates from readily available starting materials.

A further object of this invention is to provide a simple method for the preparation of alkali metal iron (IV) and iron (VI) ferrates.

A further object of this invention is to provide a method for the preparation of alkali metal iron (IV) and iron (VI) ferrates wherein the ferrate is produced in a non-aqueous state.

DETAILED DESCRIPTION OF THE INVENTION

In accordance with the invention, alkali metal ferrates are formed by reacting:

(a) either alkali metal nitrate or alkali metal nitrite with (b) either an ore known as hematite (primarily comprised of $Fe_2O_3$), an ore known as magnetite (primarily comprised of $Fe_3O_4$), or an iron compound which self-reacts via thermal decomposition to form $Fe_2O_3$.

The significance of these reactions of the invention primarily resides in their ability to produce iron (IV) or iron (VI) in high yield amounts, and from inexpensive, readily-available starting materials (e.g., iron oxides, hematite, magnetite, iron compounds which form hematite, and potassium nitrate and nitrite) without the need for complicated electrochemical procedures, initial preparation of reactants and the like.

A further significance of these reaction schemes of the invention resides in their ability to form iron (VI) alkali metal ferrate directly and not in solution.

Prior methods used in the thermal fusion synthesis of iron(IV) ferrate involve the initial formation of alkali metal ferrite ($MFeO_2$ or $M_2Fe_2O_4$) which is the fusion product of $Fe_2O_3$ and a suitable alkali metal base, e.g. MOH or $M_2CO_3$. The alkali metal ferrite is then fused with alkali metal oxide or peroxide to form iron(IV) ferrate. Other thermal fusion methods used in the synthesis of iron(IV) ferrate involve the thermal fusion of alkali peroxide and alkali oxides with iron oxides to form a product which is entirely iron(IV) metal ferrate.

The formation of iron (VI) alkali metal ferrate has been achieved by such reactions only as a result of the ability of iron (IV) itself to form iron (VI) when dissolved in water by the following reaction;

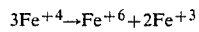
$3Fe^{+4} \rightarrow Fe^{+6} + 2Fe^{+3}$

The significance of the present reactions of the invention therefore resides in the direct formation of iron (VI) ferrate without the need for procedures which involve indirect production of the ferrate in solution. Preferred alkali metal compounds for use in the reactions of the invention are those of potassium, although sodium compounds may also be used to advantage.

In accordance with the method of this invention, reactions are carried out between alkali nitrates (or nitrites) and hematite or an iron compound which thermally decomposes to form hematite ($Fe_2O_3$), with the reactants being heated to produce the desired reaction.

Initially the solid reagents are preferably comminuted and formed into a mixture in proportions suitable for the desired reaction. The molar ratio of hematite to the alkali nitrate of the mixture is in the range extending between about 1:2.3 and about 1:8.5, and preferably is from about 1:4 to about 1:5.

Where magnetite ($Fe_3O_4$) is chosen as the iron oxide, the molar ratio is preferably in the range extending between about 1:7 to about 1:8.

Ores comprising hematite and magnetite can contain small amounts of silicon dioxide ($SiO_2$) as well as trace amounts of first transition metal oxides which do not adversely affect the reaction.

Where an iron compound which thermally decomposes upon heating to form hematite is used in the reaction, the respective molar ratio of iron compound to alkali nitrate, based upon the ratio of atomic iron content to nitrate, is preferably in the range extending from about 1:4 to about 1:5.

Preferred iron compounds which thermally decompose to form $Fe_2O_3$ are alpha FeO(OH) (geothite) and gamma FeO(OH) (lepidocrocite). Geothite decomposes at about 500° C. to form alpha hematite ("native" hematite). Lepidocrocite which is formed during the rusting of iron decomposes when heated above about 250° C. to form gamma hematite (not naturally found). Alpha and gamma hematite differ only in their crystalline structure and magnetic susceptibility, and are equally efficacious in producing alkali metal iron(IV) and (VI) ferrates according to the present invention. Gamma $Fe_2O_3$ is converted to alpha $Fe_2O_3$ when heated in air above 400° C. Inasmuch as the subject reactions of the invention are carried out at or above about 800° C., the transformation of geothite and lepidocrocite to hematite begins well before the subject reactions begin.

For the purpose of the subject reactions of the invention, the transformation to hematite is essentially complete if the molar ratio of geothite or lepidocrocite (based upon atomic iron content) to alkali nitrate (or nitrite) is kept at about 1:2 to about 1:3.

The comminuted reagents are subjected to a temperature of at least about 800° C., preferably from about 800° C. to about 1100° C., and most preferably at a temperature of about 960° C. The reaction is carried out in an appropriate vessel such as a stainless steel, zirconium or other suitable ceramic vessel. The time necessary for reaction will vary depending upon the specific choice of reagents, reagent ratios and temperature, higher temperatures yielding faster reactions. Generally, ferrate formation will begin after about 5 minutes and in most cases will be complete in less than 2 hours, and in essentially all cases complete reaction will occur in less than 3 hours.

The product resulting from the reactions involving alkali nitrate is a block solid mass and comprises alkali metal iron (IV) and iron (VI) ferrates together with other products, including unreacted iron oxide, and unreacted alkali metal nitrates and nitrites, peroxides and oxides.

The method of the invention can also be carried out with reactions employing alkali metal nitrites (preferably potassium nitrite). The molar ratio of iron oxide to the alkali nitrite generally is between about 1:3 and 1:8, and preferably is from about 1:4 to about 1:5. Generally the reactants are subjected to a temperature greater than about 780° C., preferably in the range extending from about 860° C. to about 1100° C., and most preferably at about 960° C.

Where an iron compound which thermally decomposes to form hematite is used in the reaction, the molar ratio of iron compound to the alkali nitrate (or nitrite), based upon the ratio of atomic iron to nitrate (or nitrite), generally is between about 1:2 and about 1:4, and preferably is from about 1:2.5 to about 1:3.

The reaction of the reagents in carrying out the method of the invention may be conducted at a substantially constant temperature or, alternatively, may be conducted in a stepwise manner with gradual increases in temperature until the reaction is completed.

The product of the reactions involving alkali nitrite is a black solid mass and comprises alkali metal iron (IV) and iron (VI) ferrates, with the exact presence of the iron (VI) ferrate being unknown when the yield of the reaction is less than about 42%.

The reaction product remitting from the method of the invention when alkali nitrate or alkali nitrite is employed is useful per se as a source of iron (IV) or iron (VI) ferrate or, preferably, as a progenitor for production of a substantial quantity of iron (VI) ferrate therefrom through dissolution of the reaction product in water.

The alkali nitrates and nitrites preferred for use in the present invention are those having potassium, sodium, cesium, or rubidium as the alkali component. Potassium nitrate and potassium nitrite are most preferred.

The methods of the present invention are described in further detail with reference to the following illustrative

EXAMPLES

EXAMPLE 1

Five grams of $Fe_2O_3$ (flue dust) and 15.8 grams of $KNO_3$ (1:5 molar ratio) were mixed and heated for 60 minutes at 850° C. in an atmosphere of $N_2$ gas. The resulting fusion ferrate yield was less than 1.0%.

EXAMPLE 2

Five grams of $Fe_2O_3$ and 15.8 grams of $KNO_3$ (1:5 molar ratio) were mixed and heated for 30 minutes at 950° C. in an atmosphere of $N_2$ gas. The resulting fusion ferrate yield was 34.4%.

EXAMPLE 3

Five grams of $Fe_2O_3$ and 15.8 grams of $KNO_3$ (1:5 molar ratio) were mixed and heated for 30 minutes at 950° C. in an atmosphere of argon gas. The resulting fusion ferrate yield was 42.0%.

EXAMPLE 4

Five grams of $Fe_2O_3$ and 12.6 grams of $KNO_3$ (1:4 molar ratio) were mixed and heated for 30 minutes at 950° C. in an atmosphere of argon gas. The resulting fusion ferrate yield was 33.2%.

EXAMPLE 5

Five grams of $Fe_3O_4$ and 15.8 grams of $KNO_3$ (1:7 molar ratio) were mixed and heated for 50 minutes at 950° C. in an atmosphere of argon gas. The resulting fusion ferrate yield was 33.0%.

EXAMPLE 6

Five grams of $Fe_2O_3$ and 15.8 grams of $KNO_3$ (1:5 molar ratio) were mixed and heated for 30 minutes at 950° C. in an atmosphere of air. The resulting fusion ferrate yield was 23.0%.

EXAMPLE 7

Five grams of $Fe_2O_3$ and 15.8 grams of $KNO_3$ (1:5 molar ratio) were mixed and heated for 15 minutes at 1000° C. in an atmosphere of $N_2$ gas. The resulting fusion ferrate yield was 33.7%.

EXAMPLE 8

Five grams of $Fe_2O_3$ and 15.8 grams of $KNO_3$ (1:5 molar ratio) were mixed and heated for 15 minutes at 1050° C. in an atmosphere of $N_2$ gas. The resulting fusion ferrate yield was 41.5%.

EXAMPLE 9

Five grams $Fe_2O_3$, 13.3 grams $NaNO_3$ and 3.3 grams $Na_2CO_3$ (1:5:1 molar ratio) were mixed and heated for thirty minutes at 900° C. in an atmosphere of argon gas. The resulting fusion ferrate yield was less than 1%, ($Na_2CO_3$ added as fluxing agent).

EXAMPLE 10

Seven grams $Fe_2O_3$ and 10.2 grams $KNO_3$ (1:2.3 molar ratio) were mixed and heated for 75 minutes at 960° C. in an atmosphere of argon gas. The resultant fusion ferrate yield was 4.3%.

EXAMPLE 11

Six grams $Fe_2O_3$ and 15.1 grams $KNO_3$ (1:4 molar ratio) were mixed and heated for 75 minutes at 960° C. in an argon gas atmosphere. The resultant fusion ferrate yield was 40.3%.

EXAMPLE 12

Five grams $Fe_2O_3$ and 15.8 grams $KNO_3$ (1:5 molar ratio) were mixed and heated for 75 minutes at 960° C. in an argon gas atmosphere. The resultant fusion ferrate yield was 54.2%.

EXAMPLE 13

1.64 grams $Fe_2O_3$ and 10 grams $CsNO_3$ (1:5 molar ratio) were mixed and heated for 60 minutes at 960° C. in an argon gas atmosphere. The resultant fusion ferrate yield was 11.0%.

EXAMPLE 14

Five grams $Fe_2O_3$ (steel mill flue dust) and 15.8 grams $KNO_3$ (1:5 molar ratio) were mixed and heated at 960° C. for 75 minutes in an argon gas atmosphere. The resultant fusion ferrate yield was 53.4%.

EXAMPLE 15

Five grams $Fe_2O_3$ and 15.8 grams $KNO_3$ (1:5 molar ratio) were mixed and heated at 950° C. for 75 minutes in $N_2$ gas atmosphere. The resultant fusion ferrate yield was 52.2%.

EXAMPLE 16

Five grams $Fe_2O_3$ and 15.8 grams $KNO_3$ (1:5 molar ratio) were mixed and heated at 950° C. for 75 minutes in an atmosphere of air. The resultant fusion ferrate yield was 11.9%.

EXAMPLE 17

Six grams of $Fe_3O_4$ and 19.7 grams of $KNO_3$ (1:7.5 molar ratio) were mixed and heated for 75 minutes at 960° C. in an argon gas atmosphere. The resultant fusion ferrate yield was 41.5%.

The reactions of Examples 1–5, 7–15 and 17 hereinabove were carried out in stainless steel reaction vessels and heated in a tube furnace through which a constant flow of inert gas was maintained at about 100 ml/minute at atmospheric pressure.

The percent yield in the above examples was determined by spectrophotometric measurement of the Fe(VI) content of aqueous solutions prepared from the reaction product (pulverized) as compared to solutions prepared from a standard $K_2FeO_4$ prepared according to the method of Schreyer, et al., Anal. Chem. 22:691 (wet chemical oxidation of Fe(III) by hypochlorite, followed by chemical precipitation of $FeO_4^{2-}$ with KOH, forming $K_2FeO_4$ which, upon recrystallization, is substantially pure).

What is claimed is:

1. A method for producing alkali metal iron (IV) ferrate comprising the steps of:
   (a) forming a particulate mixture of reactants including an alkali metal nitrogen oxygen compound selected from the group consisting of alkali metal nitrate and alkali metal nitrite; and an iron material selected from the group consisting of, $Fe_2O_3$, $Fe_3O_4$, hematite, magnetite, and an iron compound which thermally decomposes at a temperature less than about 1100° C. to form $Fe_2O_3$; and
   (b) subjecting the mixture of reactants to a temperature in the range of about 780° C. to about 1100° C. for a period of time in the range of about 5 minutes to about 2 to 3 hours, in an atmosphere in which there is an absence of free oxygen, sufficient to bring about a reaction to produce alkali metal iron (IV) ferrate.

2. The method of claim 1 wherein said temperature is about 960° C.

3. The method of claim 1 wherein the alkali metal nitrate is selected from the group consisting of potassium nitrate, cesium nitrate, sodium nitrate and rubidium nitrate.

4. The method of claim 1 wherein the alkali metal nitrite is selected from the group consisting of potassium nitrite, cesium nitrite, sodium nitrite and rubidium nitrite.

5. The method of claim 1 wherein said iron compound which thermally decomposes at a temperature less than about 1100° C. to form $Fe_2O_3$ is selected from the group consisting of geothite and lepidocrocite.

6. The method of claim 1 wherein the molar ratio of said alkali metal nitrate to said $Fe_2O_3$ is in the range extending from between about 2.3:1 to about 8.5:1.

7. The method of claim 1 wherein the molar ratio of said alkali metal nitrite to said $Fe_2O_3$ is in the range extending from between about 3:1 to about 8:1.

8. The method of claim 1 wherein the molar ratio of said alkali metal nitrate to said $Fe_3O_4$ is in the range extending from about 7:1 to about 8:1.

9. The method of claim 1 wherein the molar ratio of said alkali metal nitrate to said $Fe_2O_3$ is in the range extending from about 1:4 to about 1:5.

10. The method of claim 1 wherein the molar ratio of said alkali metal nitrate to said iron compound which thermally decomposes is in the range extending from about 4:1 to 5:1 based upon the atomic iron content of said iron compound which thermally decomposes.

11. The method of claim 1 wherein the molar ratio of said alkali metal nitrate to said iron compound which thermally decomposes is in the range extending from about 2:1 to about 4:1 based upon the atomic iron content of said iron compound which thermally decomposes.

12. The method of claim 1 wherein the step of subjecting the mixture of reactants to a temperature in the range of about 780° C. to about 1100° C., is carried out in a substantially inert atmosphere.

13. A method for producing alkali metal iron (VI) ferrate comprising the steps of:
(a) forming a particulate mixture of reactants including an alkali metal nitrogen oxygen compound selected from the group consisting essentially of alkali metal nitrate and alkali metal nitrite; and an iron material selected from the group consisting of $Fe_2O_3$, $Fe_3O_4$, hematite, magnetite, and an iron compound which thermally decomposes at a temperature less than about 1100° C. to form $Fe_2O_3$; and
(b) subjecting the mixture of reactants to a temperature in the range of about 780° C. to about 1100° C. for a period of time in the range of about 5 minutes to about 2 hours, in an atmosphere in which there is an absence of free oxygen, sufficient to bring about a reaction to produce alkali metal iron (VI) ferrate.

14. The method of claim 13 wherein said temperature is about 960° C.

15. The method of claim 13 wherein the alkali metal nitrate is selected from the group consisting of potassium nitrate, cesium nitrate, sodium nitrate and rubidium nitrate.

16. The method of claim 13 wherein the alkali metal nitrite is selected from the group consisting of potassium nitrite, cesium nitrite, sodium nitrite and rubidium nitrite.

17. The method of claim 13 wherein said iron compound which thermally decomposes at a temperature less than about 1100° C. to form $Fe_2O_3$ is selected from the group consisting of geothite and lepidocrocite.

18. The method of claim 13 wherein the molar ratio of said alkali metal nitrate to said $Fe_2O_3$ is in the range extending from between about 2.3:1 to about 8.5:1.

19. The method of claim 13 wherein the molar ratio of alkali metal nitrate to said $Fe_3O_4$ is in the range extending from about 7:1 to about 8:1.

20. The method of claim 13 wherein the molar ratio of said alkali metal nitrate to said $Fe_2O_3$ is in the range extending from about 1:4 to about 1:5.

21. The method of claim 13 wherein the molar ratio of said alkali metal nitrate to said iron compound which thermally decomposes is in the range extending from about 4:1 to about 5:1 based upon the atomic iron content of said iron compound which thermally decomposes.

22. The method of claim 13 wherein the molar ratio of said alkali metal nitrate to said iron compound which thermally decomposes is in the range extending from about 2:1 to about 4:1 based upon the atomic iron content of said iron compound which thermally decomposes.

23. The method of claim 13 wherein the step of subjecting the mixture of reactants to a temperature in the range of about 780° C. to about 1100° C. is carried out in a substantially inert atmosphere.

* * * * *